Jan. 5, 1932.  I. B. LASKOWITZ  1,839,683
BALANCED WEDGE CHECK VALVE
Filed Nov. 1, 1929

Inventor
Isidor B. Laskowitz
By Robert Dennison
Attorney

Patented Jan. 5, 1932

1,839,683

UNITED STATES PATENT OFFICE

ISIDOR B. LASKOWITZ, OF BROOKLYN, NEW YORK

BALANCED WEDGE CHECK VALVE

Application filed November 1, 1929. Serial No. 404,095.

The present invention relates to improvements in check valves and has reference more particularly to a balanced wedge check valve.

One of the important objects of the present invention resides in the provision of a check valve of the above mentioned character that will operate positively and efficiently at all times and without noise, slamming or clattering.

A further and important object is to provide a balanced wedge check valve of the above mentioned character that is constructed in such a manner as to be balanced under all conditions of varying pressure, the pressure being equally applied to the opposite sides of the valve, a wedging action taking place coincident with the movement of the valve to a closed position, so that the reverse flow of the fluid will be absolutely prevented.

A further object is to provide a balanced wedge check valve of the above mentioned character which is simple in construction, inexpensive, strong and durable, and further well adapted to the purpose for which it is designed.

Other objects and advantages of the invention will become apparent from the following description when taken in connection with the accompanying drawings.

In the accompanying drawings, wherein like reference characters designate corresponding parts throughout the same:

Figure 1:
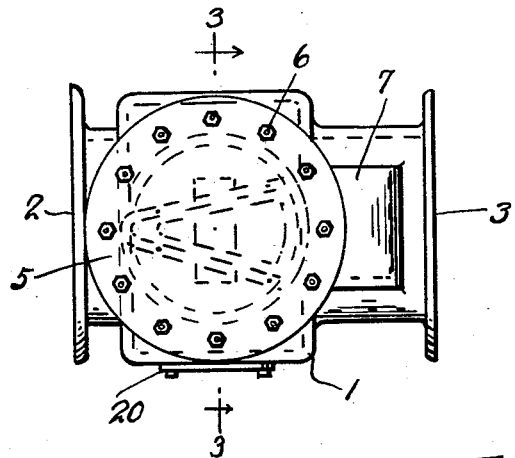
Figure 1 is a top plan view of the balanced wedge check valve embodying my invention.

In the drawings wherein for the purpose of illustration is shown the preferred embodiment of my invention, the numeral 1 designates the body of the valve, the same being provided with the flanged open end portions 2 and 3 respectively for connection with suitable pipes (not shown) through which the fluid is adapted to flow. The open end portions 2 and 3 constitute inlet and outlet chambers, respectively, and it will be observed upon referring to Figure 4 of the drawings that these chambers are disposed in alignment with each other.

The top portion of the valve body 1 is open and extending upwardly therefrom is the neck 4, the upper edge thereof being flanged and removably secured thereover is the cover plate 5, the securing means for the cover plate being shown at 6.

Figure 2:
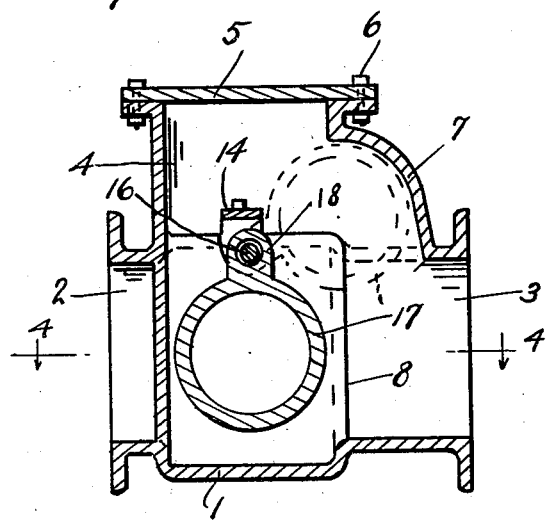
Figure 2 is a vertical sectional view taken approximately on the line 2—2 of Figure 4, looking in the direction of the arrows.

Upon referring more particularly to Figures 1 and 2 of the drawings, it will be observed that the neck 4 is formed at one side with a pocket 7, the purpose thereof being hereinafter and more fully described.

Formed within the valve body 1 and arranged vertically therein is the substantially V-shaped partition denoted generally by the numeral 8. The apex portion of the V-shaped partition 8 is arranged in the approximate center of the valve body and terminates inwardly of the inlet end of said valve body.

Figure 4:
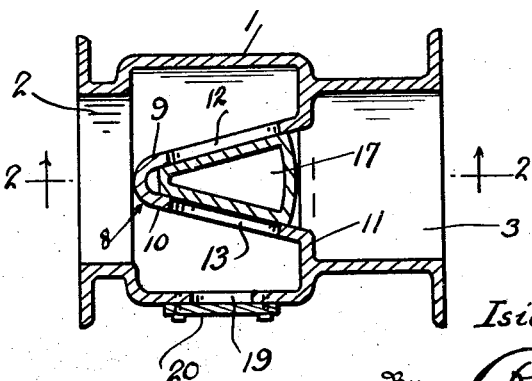
Figure 4 is a horizontal cross section taken approximately on the line 4—4 of Figure 2.

The side walls 9 and 10 of the V-shaped partition merge at their outer free ends with the adjacent portion of the valve body as at 11, with reference more particularly to Figure 4. This V-shaped partition will prevent direct communication between the inlet and outlet chambers 2 and 3, respectively. The side walls 9 and 10 are formed with the circular ports 12 and 13, respectively, and these ports are arranged in alignment with each other. The area of each port is adapted to be substantially equal to one-half the area of either the inlet or outlet chamber, so that the combined areas of the ports 12 and 13 are substantially equal to the area of either of the chambers 2 and 3. This arrangement will render the velocities through the valve uniform and substantially constant.

Figure 3:
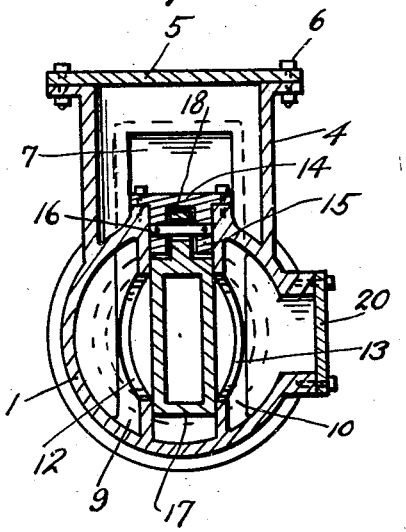
Figure 3 is also a vertical section taken at right angles to Figure 2, upon the lines 3—3 of Figure 1, looking in the direction of the arrows.

The upper edges of the side walls of the V-shaped partition 8 project slightly above the upper edges of the inlet and outlet chambers and extending across the upper edges of the intermediate portions of the side walls of the V-shaped partition and adapted to be secured in any suitable manner, is the crosspiece or strip 14, from which depends the spaced lugs 15, said lugs being disposed between the inner opposed faces of the side walls of the V-shaped partition as suggested more clearly in Figure 3. A cross-pin 16 extends through registering openings formed in the spaced lugs 15.

Forming a salient part of the present invention is the wedge shaped hollow valve plug 17, the outer faces of the opposite sides of this plug being substantially smooth for co-operation with the respective inner faces of the side walls of the V-shaped partition. An apertured ear 18 is formed on the top of the hollow valve plug 17 for disposition between the depending spaced lugs 15 and the pin 16 extends through the apertured ear 18 as is clearly shown in Figures 2 and 3, whereby to provide for a free vertical swinging movement of the hollow valve plug 17.

One side of the valve body 1 is formed with an opening 19 to permit access to the interior of the valve body and this opening is normally closed by the removable cover plate 20.

Normally, the valve plug 17 is disposed in its lowered closed position whereby the side faces of the wedge shaped plug are arranged in wedging engagement with the inner faces of the respective sides of the V-shaped partition thus closing the ports 12 and 13 and preventing the reverse flow of the fluid from the outlet chamber to the inlet chamber. The center of gravity of the plug 17 when in its vertical or closed position is slightly to the right of the center of the pin or pivot 16, so that there will always be a tendency for the check valve to automatically move or swing downwardly to a closed position by gravity and sufficient clearance is provided to permit the easy and efficient operation of the vertically swinging valve plug.

The valve plug is swung upwardly to the dotted line position whereby said plug will have a portion thereof disposed within the pocket 7 by the action of the fluid passing through the inlet chamber and through the ports 12 and 13 and the pressure acting on both faces of the wedge shaped valve plug 17 will be equal and as a result, balanced at all times.

It will thus be seen from the foregoing description, that I have provided a balanced wedge check valve that will at all times be positive and efficient in its operation and furthermore, said valve will operate without causing any noise, slamming or clattering. The simplicity of my improved check valve renders the same inexpensive in its manufacture, yet strong and durable.

While I have shown the preferred embodiment of my invention, it is to be understood that minor changes in the size, shape and arrangement of parts may be resorted to, without departing from the spirit of the invention and the scope of the appended claims.

Having thus described my invention, what I claim as new and desire to secure by Letters Patent, is:

1. In a check valve of the class described, the combination of a body provided with inlet and outlet chambers at its respective ends, and a wedge shaped pivoted check valve mounted for swinging movement longitudinally with respect to said chambers within the valve body, the side faces of said valve being subjected to the same pressure as in one of said chambers.

2. In a check valve, the combination of a body provided with inlet and outlet chambers at its respective ends, a substantially V-shaped partition arranged vertically within the central portion of said valve body, the side walls of said partition being formed with ports, the inner faces of said side walls forming a valve seat, and a wedge shaped valve plug arranged for vertical swinging movement between the side walls of the V-shaped partition, said valve plug cutting off communication between the inlet and outlet chambers when in a lowered position and disposed over said ports, said ports affording communication between the chambers when the valve plug is raised to uncover the ports.

3. In a check valve, the combination of a body provided with inlet and outlet chambers at its respective ends, a substantially V-shaped partition arranged vertically within the central portion of said valve body, the side walls of said partition being formed with ports, the inner faces of said side walls forming a valve seat, and a wedge shaped valve plug arranged for vertical swinging movement between the side walls of the V-shaped partition, said valve plug cutting off communication between the inlet and outlet chambers when in a lowered position and disposed over said ports, said ports affording communication between the chambers when the valve plug is raised to uncover the ports, said wedge shaped valve plug being automatically raised to an inoperative position by the pressure of the fluid engaging the respective sides of the valve plug.

4. In a check valve, the combination of a body provided with inlet and outlet chambers at its respective ends, a substantially V-shaped partition arranged vertically within the central portion of said valve body, the side walls of said partition being formed with ports, the inner faces of said side walls forming a valve seat, and a wedge shaped valve plug arranged for vertical swinging movement between the side walls of the V-shaped partition, said valve plug cutting off communication between the inlet and outlet chambers when in a lowered position and disposed over said ports, said ports affording communication between the chambers when the valve plug is raised to uncover the ports, said wedge shaped valve plug being automatically raised to an inoperative position by the pressure of the fluid engaging the respective sides of the valve plug, said valve plug being automatically moved to a lowered operative position by gravity for closing the port.

5. In a check valve, the combination of a body provided with inlet and outlet chambers at its respective ends, a substantially V-shaped partition arranged vertically within the central portion of said valve body, the side walls of said partition being formed with ports, the inner faces of said side walls forming a valve seat, and a wedge shaped valve plug arranged for vertical swinging movement between the side walls of the V-shaped partition, said valve plug cutting off communication between the inlet and outlet chambers when in a lowered position and disposed over said ports, said ports affording communication between the chambers when the valve plug is raised to uncover the ports, each of the ports being of an area substantially equal to one-half the area of the inlet and outlet chambers respectively.

6. In a valve construction of the class described, a valve body, provided with inlet and outlet chambers, a V-shaped partition arranged longitudinally between the chambers and provided with registering ports in the respective sides thereof, and a vertically swinging wedge-shaped valve plug for co-operation with the inner opposed faces of the sides of the V-shaped partition for closing the ports when said valve plug is in its lowered position said valve swinging longitudinally with respect to the chambers.

7. In a valve construction of the class described, a valve body provided with inlet and outlet chambers, a V-shaped partition arranged between the chambers and provided with registering ports in the respective sides thereof, and a vertically swinging wedge-shaped valve plug for co-operation with the inner opposed faces of the sides of the V-shaped partition for closing the ports when said valve plug is in its lowered position, said valve plug being automatically moved upwardly to an open position by the pressure of the fluid passing through said ports.

8. In a valve construction of the class described, a valve body provided with inlet and outlet chambers, a V-shaped partition arranged between the chambers and provided with registering ports in the respective sides thereof, and a vertically swinging wedge-shaped valve plug for co-operation with the inner opposed faces of the sides of the V-shaped partition for closing the ports when said valve plug is in its lowered position, said valve plug being automatically moved upwardly to an open position by the pressure of the fluid passing through said ports, said partition and valve plug being arranged longitudinally in line with the inlet chamber.

9. In a balanced check valve of the class described, the combination of a body provided with aligned inlet and outlet chambers at its respective ends, a substantially V-shaped partition arranged vertically and centrally within the valve body, the apex thereof being disposed adjacent the inlet chamber, the ends of the side walls of the said V-shaped partition merging with the adjacent sides of the valve body adjacent the outlet chamber, the side walls being formed with registering ports, a wedge shaped valve plug mounted for vertical swinging movement between the inner opposed faces of the side walls of the V-shaped partition, and means for mounting said valve plug whereby the same will automatically move to a closed position for wedging engagement with the inner opposed faces of the side walls of the partition to close the ports, the valve plug being automatically swung upwardly to an open position by the pressure of the fluid passing through the ports from the inlet chamber toward the outlet chamber.

10. In a balanced check valve of the class described, the combination of a body provided with aligned inlet and outlet chambers at its respective ends, a substantially V-shaped partition arranged vertically and centrally within the valve body, the apex thereof being disposed adjacent the inlet chamber, the ends of the side walls of said V-shaped partition merging with the adjacent sides of the valve body adjacent the outlet chamber, the side walls being formed with registering ports, a wedge shaped valve plug mounted for vertical swinging movement between the inner opposed faces of the side walls of the V-shaped partition, and means for mounting said valve plug whereby the same will automatically move to a closed position for wedging engagement with the inner opposed faces of the side walls of the partition to close the ports, the valve plug being automatically swung upwardly to an open position by the pressure of the fluid passing through the ports from the inlet chamber toward the outlet chamber, said mounting comprising an upstanding apertured ear carried by the top of the valve plug, a cross pin mounted in the valve body between the intermediate portions of the sides of the V-shaped partition adjacent the upper edges thereof, said apertured ear being arranged for swinging movement on the said cross pin.

11. In a balanced check valve of the class described, the combination of a body provided with aligned inlet and oulet chambers at its respective ends, a substantially V-shaped partition arranged vertically and centrally within the valve body, the apex thereof being disposed adjacent the inlet chamber, the ends of the side walls of said V-shaped partition merging with the adjacent sides of the valve body adjacent the outlet chamber, the side walls being formed with registering ports, a wedge shaped valve plug mounted for vertical swinging movement between the inner opposed faces of the side walls of the V-shaped partition, and means for mounting said valve plug whereby the same will automatically move to a closed position for wedging engagement with the inner opposed faces of the side walls of the partition to close the ports, the valve plug being automatically swung upwardly to an open position by the pressure of the fluid passing through the ports from the inlet chamber toward the outlet chamber, and a pocket formed in the upper portion of the valve body to receive said valve plug when the latter is in its raised position.

In testimony whereof I affix my signature.

ISIDOR B. LASKOWITZ.